UNITED STATES PATENT OFFICE.

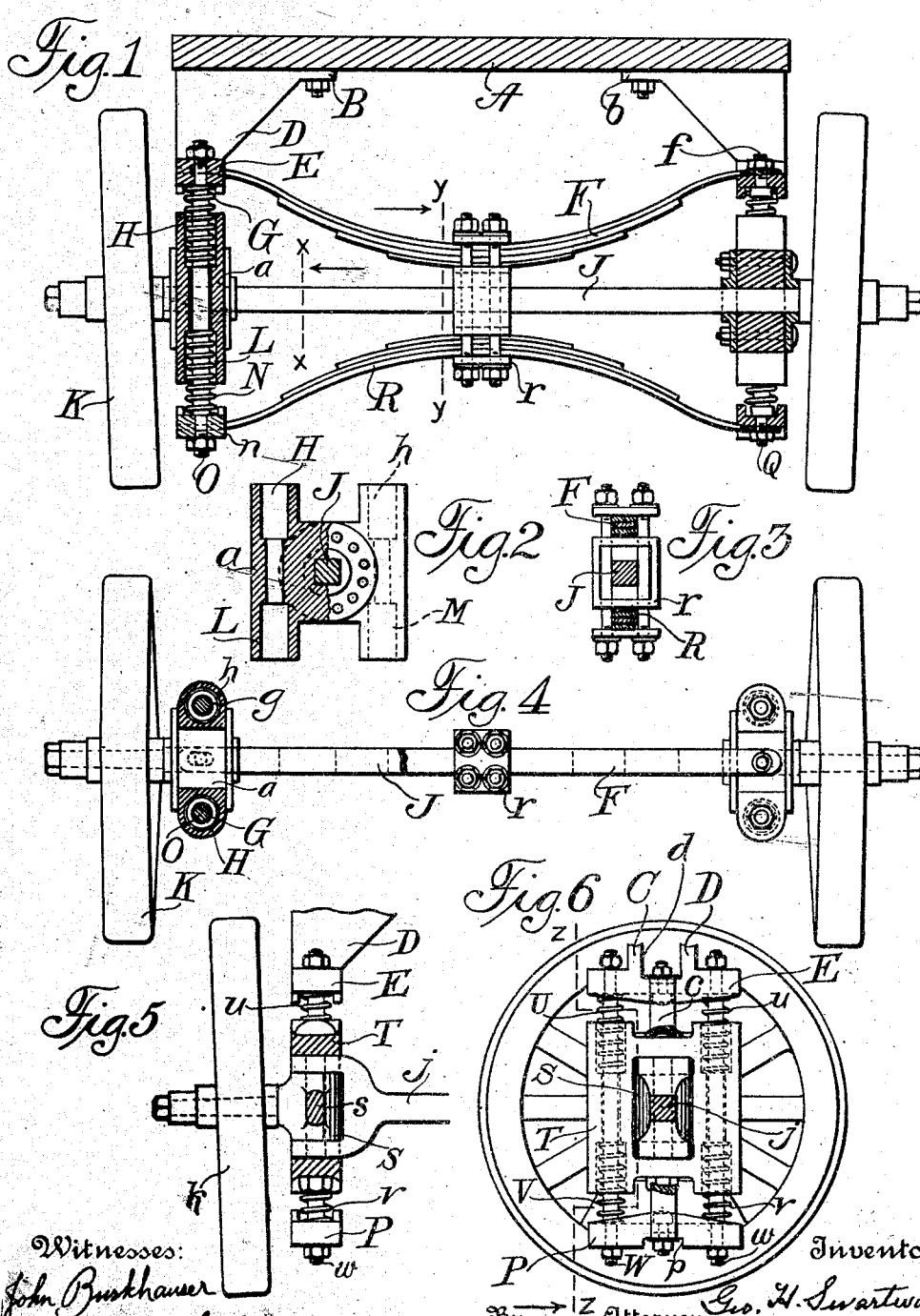

GEORGE H. SWARTWOUT, OF BROOKLYN, NEW YORK.

VEHICLE SPRING-GEAR.

1,174,773.　　　　Specification of Letters Patent.　　Patented Mar. 7, 1916.

Application filed July 13, 1915. Serial No. 39,624.

*To all whom it may concern:*

Be it known that I, GEORGE H. SWARTWOUT, a citizen of the United States, residing at Brooklyn, in the county of Kings and State of New York, have invented certain new and useful Improvements in Vehicle Spring-Gears, of which the following is a specification.

This invention relates to vehicle spring gear intended for use with wheeled conveyances, self-propelled or otherwise, and its purpose is to provide a combination of resilient supporting members having special form, construction and arrangement with respect to each other, by which it is believed a particularly desirable cushioning result is obtained against unpleasant or injurious up and down impulses as well as against those tending to rock the body sidewise more or less violently.

It is an object also of the special construction and arrangement of parts herein set forth, to produce spring gear having the nature of a shock absorber, and by the use of which abrupt movements of whatever character due to the progress of a vehicle over an uneven roadway are in a large measure taken up and reduced in effect.

In the accompanying drawings the construction and arrangement of the parts of this invention are illustrated.

Figure 1 represents a portion of a frame and a rear axle of a vehicle to which this invention has been applied, and all parts are shown assembled. Parts of the elements termed riders or riding frames in this description are shown in vertical section. Fig. 2 is a broadside view of one of the riders upon the axle, the axle being shown in section on the broken line $x$—$x$ of Fig. 1, and the view being taken in the direction of the arrow. One side of the rider is drawn in vertical section to disclose the spring seats. Fig. 3 is a side view of the axle clip by which the middle portions of the transverse leaf springs are secured together upon the axle. The springs and axle are shown in cross section upon the vertical broken line $y$—$y$ of Fig. 1. Fig. 4 is a top plan view of this invention, the body or frame of the vehicle being omitted, and one of the riders, which are located upon the axle near its ends, is shown in horizontal section. Fig. 5 is a rear view of one of the front wheels of an automobile vehicle, and shows the pivotal arrangement of the wheel in the fork of the front axle, and the modified form of rider applied thereto. The rider is shown in vertical section upon the indirect broken line $z$—$z$ of Fig. 6. Fig. 6 is a view of the rider on a front axle as shown in Fig. 5, the view being taken from between the wheels and the axle being shown in cross-section.

Throughout the description and drawings, the same letter is employed to refer to the same part.

Considering the drawings, the body or vehicle frame A has side pieces or brackets B and $b$ secured to it, and each of the brackets, which are all alike, has two angular webs or walls C and D, as best shown in Fig. 6, between which webs is an opening $d$. The opening $d$ extends downwardly into a transverse base or bottom of the bracket marked E, and the lower part of the opening $d$ forms a small recess in the base E as shown. The brackets B and $b$ are connected by an upper leaf spring F, secured to the brackets by bolts such as the bolt $f$ shown in Fig. 1. The spring F will be again mentioned.

Near the ends of the axle are the riders $a$, which hold the coil springs G and $g$ in vertical positions in spring seats H and $h$. It will be noted in Fig. 2 that the spring seats are upon both sides of the axle J. The wheels K are located upon the outside of the riders $a$ as illustrated. The spring seats H and $h$ mentioned above are formed in the upper part of the rider, and may be termed the upper spring seats. In the lower part of the rider are formed like spring seats L and M, opening downwardly, and these may be termed the lower spring seats. Vertical coil springs each having an end occupying a spring seat are arranged in the seats L and M. These coil springs are of the same size and form as the springs G and $g$, and one of them designated by the letter N is shown in Fig. 1. Below the rider $a$ in Fig. 1, the crosshead $n$ is shown in cross-section. This cross-head has exactly the same shape as the cross-head P, a side view of which is set forth in Fig. 6, and each cross-head has a small middle recess in its lower surface such as the recess $p$. In Fig. 1 a bolt Q is shown securing one end of the lower leaf spring R in one of the cross-heads, and the other end of the transverse leaf spring R is secured to the crosshead $n$ in like fashion. An axle clip or clamping device $r$, as best shown in Fig. 3, secures the middle portions of the leaf springs F and R to the axle J.

Considering Figs. 5 and 6, the front wheel $k$ is shown connected with the pivotal steering knuckle S provided with the usual arm $s$ by which it may be coupled to suitable gear for steering the vehicle. The rider T is slightly modified in form to properly receive the steering knuckle and the fork of the front axle $j$. The rider T seats the upper coil springs U and $u$, and the lower coil springs V and $v$, having seats for that purpose as described in explaining the construction of the rider $a$, and the bolts W and $w$ through the rider and the coil springs connect the ends of the springs with the crossheads E and P. The bolts W and $w$ are duplicates of the bolt O shown in Fig. 1 passing through the rider $a$ and the upper and lower coil springs G and N.

In explaining the operation of this invention, attention is invited to the fact that the vertical bolts O, W and $w$ that pass through the riders and coil springs, have shouldered ends as illustrated in Fig. 1, and the crossheads $n$, E, P, are rigidly clamped upon the ends of the bolts. A downward movement of the frame or body A of the vehicle would, therefore, compress coil springs G and $g$, and their fellows on the other end of the axle, and the movement would also bend the leaf springs F and R.

It will be noted that a considerable portion of the load in the operation of this invention is carried by the middle of the axle J, and the remainder of the weight is divided between the riders at the ends of the axle.

It is believed to be clear from the foregoing description and the illustration in Fig. 1, that any rocking movement of the vehicle engages all the springs both coil and leaf, affording ample cushioning effect. Furthermore, assuming that the wheels should suddenly meet with an obstacle compelling them to rise abruptly, the upward movement of the axle would be taken up by the lower coil springs and both leaf springs and any unpleasant effect mitigated materially.

This invention is not limited to any number of coil springs or leaf springs, but is intended rather to increase the number of springs beyond the number usually employed with the view of producing a corresponding agreeable cushioning result for the occupants of the vehicle.

Having now described this invention and explained the mode of its operation, what I claim is:—

1. In vehicle spring gear, the combination with an axle, of riders located near the ends of the axle and having spring seats arranged on both sides of the axle, coil springs having each one end occupying a seat in a rider and one end projecting beyond the rider, a vehicle frame having brackets connected with the projecting ends of the said coil springs, and a leaf spring having its ends secured to the said brackets and its middle portion secured to the said axle.

2. In vehicle spring gear, the combination with an axle, of riders located upon the axle near its ends and having a plurality of upper and lower spring seats located upon both sides of the said axle, a plurality of vertical upper and lower coil springs each having one end occupying a seat in a rider and one end projecting beyond the rider, a vehicle frame having brackets arranged in connection with the projecting ends of the said upper coil springs, a leaf spring arranged above the axle and having its ends secured to the said brackets, cross-heads arranged below the said riders and in connection with the projecting ends of the said lower coil springs, a leaf spring arranged below the axle and having its ends secured to the said cross-heads, and means for securing the middle portions of the said leaf springs to the axle.

3. In a vehicle spring gear, the combination with an axle, of riders located upon the axle near its ends, the said axle passing centrally through the riders, the said riders having spring seats on both sides of the axle, vertical coil springs having each one end occupying a seat in a rider and one end projecting beyond the rider, a vehicle frame, leaf springs having portions connected with the said axle between the said riders, and means for connecting the said vehicle frame with the projecting ends of the said coil springs and with the ends of the said leaf springs.

4. In vehicle spring gear, the combination with an axle, of riders located upon and near the ends of the axle and having a plurality of upper and lower spring seats located upon both sides of the axle, a plurality of upper and lower vertical coil springs each having one end occupying a seat in a rider and one end projecting beyond the rider, a vehicle frame, leaf springs arranged above and below the axle and having portions connected with the said axle between the said riders, and means for connecting the said leaf springs and coil springs and the said vehicle frame together.

5. In vehicle spring gear, the combination with an axle, of an upper leaf spring arranged above the axle and a lower leaf spring arranged below the axle, means for securing the middle portions of the said springs to the axle, a plurality of vertical coil springs located near the ends of the axle, means supported by the axle near the ends thereof for holding the said coil springs movably in vertical positions, a vehicle frame, and means for securing the said frame and the ends of the said coil and leaf springs together.

In testimony whereof I affix my signature.

GEORGE H. SWARTWOUT.